(12) United States Patent
Katta

(10) Patent No.: US 11,316,990 B2
(45) Date of Patent: Apr. 26, 2022

(54) INFORMATION PROCESSING APPARATUS, METHOD AND NON-TRANSITORY COMPUTER READABLE MEDIUM

(71) Applicant: FUJIFILM Business Innovation Corp., Tokyo (JP)

(72) Inventor: Hitoshi Katta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 195 days.

(21) Appl. No.: 16/365,690

(22) Filed: Mar. 27, 2019

(65) Prior Publication Data
US 2019/0306329 A1    Oct. 3, 2019

(30) Foreign Application Priority Data

Apr. 3, 2018   (JP) .............................. JP2018-071304

(51) Int. Cl.
*H04N 1/00*    (2006.01)
*H04N 1/327*   (2006.01)

(52) U.S. Cl.
CPC ....... *H04N 1/0048* (2013.01); *H04N 1/00129* (2013.01); *H04N 1/32767* (2013.01); *H04N 2201/0055* (2013.01); *H04N 2201/0094* (2013.01)

(58) Field of Classification Search
CPC ............ H04N 1/0048; H04N 1/32767; H04N 1/00129; H04N 2201/0055; H04N 2201/0094
See application file for complete search history.

(56) References Cited

U.S. PATENT DOCUMENTS

| | | | |
|---|---|---|---|
| 2011/0058202 A1* | 3/2011 | St. Jacques, Jr. | H04N 1/32502 358/1.13 |
| 2017/0134606 A1* | 5/2017 | Kim | H04W 4/023 |
| 2017/0286134 A1 | 10/2017 | Sumiuchi et al. | |
| 2018/0063373 A1* | 3/2018 | Hardy | G06F 3/1226 |

FOREIGN PATENT DOCUMENTS

| | | |
|---|---|---|
| JP | 2017112618 | 6/2017 |
| JP | 2017177768 | 10/2017 |

* cited by examiner

*Primary Examiner* — Neil R McLean
(74) *Attorney, Agent, or Firm* — JCIPRNET

(57) ABSTRACT

An information processing apparatus includes a providing unit, an obtaining unit, and an informing unit. The providing unit provides a certain service to a user. The obtaining unit obtains identification information included in receivable radio waves. The informing unit provides information how a user is able to use the service provided by the providing unit if a place where the user is positioned is not a place where the service is available. The place where the user is positioned is estimated by the identification information obtained by the obtaining unit.

15 Claims, 12 Drawing Sheets

FIG. 4

| SSID | APP TO BE STARTED |
|---|---|
| BBB_free_wifi | MULTIFUNCTION COPYING MACHINE APP (FOR BBB STORES) |
| CCC_Wi-Fi | MULTIFUNCTION COPYING MACHINE APP (FOR CCC STORES) |

INFORMATION PROCESSING APPARATUS, METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-071304 filed Apr. 3, 2018.

BACKGROUND

(i) Technical Field

The present disclosure relates to an information processing apparatus and a non-transitory computer readable medium.

(ii) Related Art

Japanese Unexamined Patent Application Publication No. 2017-112618 discloses an information processing apparatus. This information processing apparatus searches for a partner communication device and generates connection information for connecting to the partner communication device based on device information obtained from a search result. The information processing apparatus then writes the generated connection information into a wireless communication tag.

Japanese Unexamined Patent Application Publication No. 2017-177768 discloses an information processing apparatus. This information processing apparatus obtains device information concerning an external device via wireless communication, and displays a screen provided by an application which causes the external device to perform a function. The information processing apparatus also displays a dialog screen for proposing performing a recommended function, based on the obtained device information.

SUMMARY

Aspects of non-limiting embodiments of the present disclosure relate to an information processing apparatus and a non-transitory computer readable medium in which, when a user is not in a place where a service to be used by the user is available, information concerning how the user can use this service or an instruction to use an alternative service is provided to the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a providing unit, an obtaining unit, and an informing unit. The providing unit provides a certain service to a user. The obtaining unit obtains identification information included in receivable radio waves. The informing unit provides information how a user is able to use the service provided by the providing unit if a place where the user is positioned is not a place where the service is available. The place where the user is positioned is estimated by the identification information obtained by the obtaining unit.

BRIEF DESCRIPTION OF THE DRAWINGS

An exemplary embodiment of the present disclosure will be described in detail based on the following figures, wherein:

FIG. 4 illustrates an example of information concerning the association between service set identifiers (SSIDs) assigned to services provided by some stores and apps for using multifunction copying machines installed in these stores;

DETAILED DESCRIPTION

An exemplary embodiment of the disclosure will be described below in detail with reference to the accompanying drawings.

Figure 1:
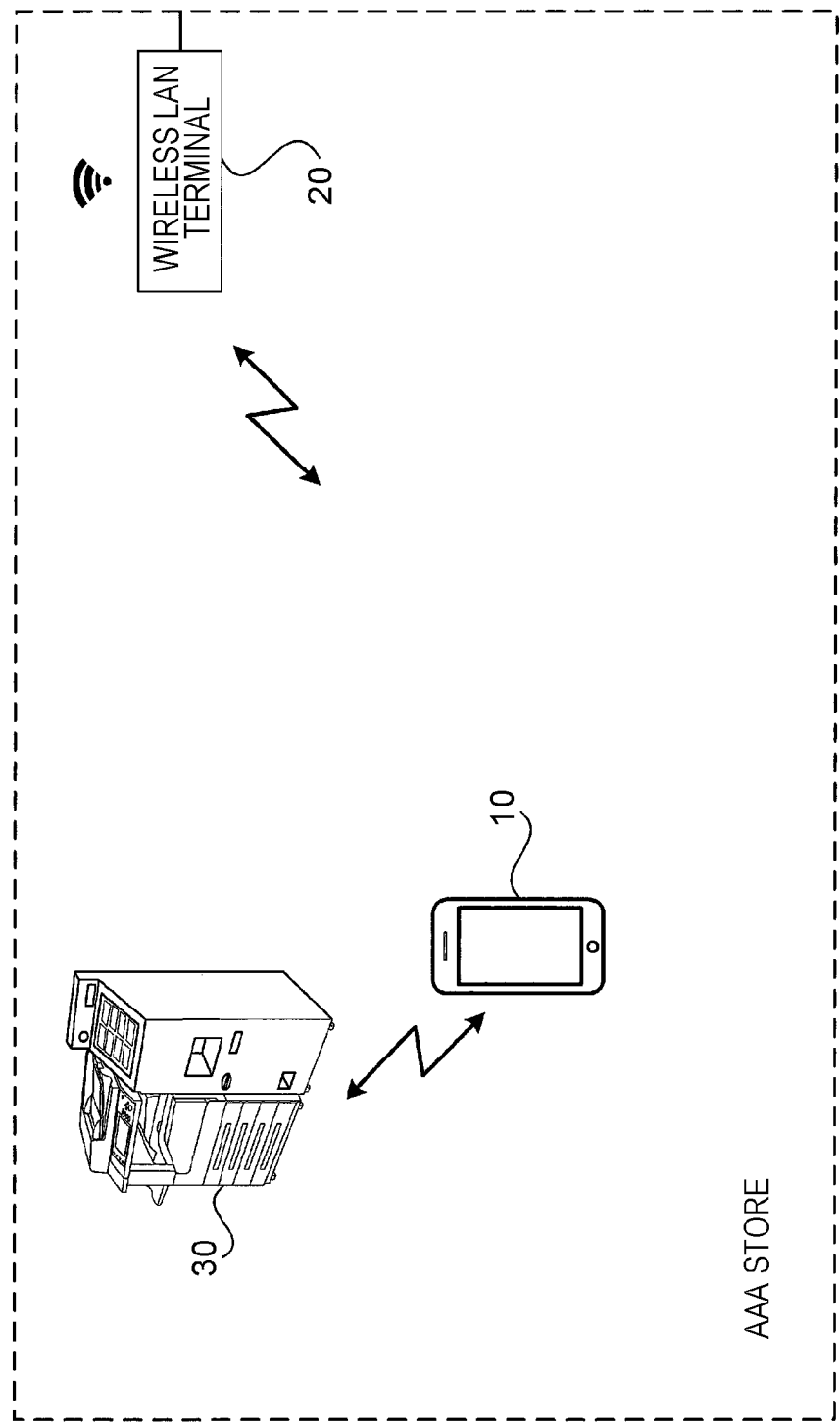
FIG. 1 is a schematic diagram illustrating an example of the configuration of an information processing system according to an exemplary embodiment.

FIG. 1 illustrates the configuration of an information processing system according to an exemplary embodiment.

As shown in FIG. 1, the information processing system according to the exemplary embodiment includes a terminal apparatus 10 and an image forming apparatus 30. The terminal apparatus 10 is a portable information processing apparatus that can be carried by a user. The image forming apparatus 30 is installed in a store, such as a convenience store.

The terminal apparatus 10 is a portable device, such as a smartphone, a tablet terminal, or a laptop personal computer (PC), connectable to a wireless local area network (LAN).

The image forming apparatus 30 is a multifunction device (multifunction copying machine) having multiple functions, such as printing, scanning, copying, and fax sending and receiving functions.

In the terminal apparatus 10, an AAA-store multifunction copying machine application program for using the image forming apparatus 30 installed in an AAA store has been downloaded. An application program will simply be called an app. By starting this app, the terminal apparatus 10 is able to perform various operations, such as providing a print instruction to the image forming apparatus 30 and receiving image data scanned by the image forming apparatus 30.

The terminal apparatus 10 and the image forming apparatus 30 may be connected to each other via a wireless LAN, such as Wi-Fi (registered trademark) or near field communication (NFC) network, such as Bluetooth (registered trademark).

In FIG. 1, the image forming apparatus 30 is installed in the AAA store, which is one of the AAA chain stores operating the business under the same store name, such as chain convenience stores.

In the AAA chain stores, each store offers a free Wi-Fi service, which is a free service for connecting to a wireless LAN. A user registers for the use of the free Wi-Fi service in advance and can connect to a Wi-Fi network to use the Internet free of charge in an AAA store.

In the AAA store shown in FIG. 1, a wireless LAN terminal 20, which serves as a wireless-LAN access point, is installed.

Radio waves transmitted from a wireless-LAN access point include a service set identifier (SSID), which is an identifier for identifying this access point. The SSID is represented by a maximum of 32 alphanumeric characters. The SSID enables a device trying to connect to a wireless LAN to identify from which access point radio waves are being transmitted.

In this exemplary embodiment, it is assumed that radio waves transmitted from the wireless-LAN access point within AAA chain stores include the SSID called "AAAspot". When a user with the terminal apparatus 10 has entered an AAA store, it receives radio waves including the SSID called "AAAspot" and can connect to a wireless LAN to use the above-described free Wi-Fi service.

In this exemplary embodiment, the SSID called "BBB#free#wifi" is used for a free Wi-Fi service of BBB stores, which are different from AAA stores, and the SSID called "CCC#wi-fi" is used for a free Wi-Fi service of CCC stores, which are different from AAA stores and BBB stores.

In each of a BBB store and a CCC store, as well as in an AAA store, a multifunction copying machine is installed, and an app for using the multifunction copying machine is distributed to users. If AAA stores, BBB stores, and CCC stores are operated by different business operators, it is not likely that a user will be able to use the multifunction copying machine installed in a BBB store or a CCC store by using the AAA-store multifunction copying machine app.

If a user is confused whether it is in an AAA store, a BBB store, or a CCC store, the following situation may occur. The user starts the AAA-store multifunction copying machine app to try to operate the multifunction copying machine installed in a BBB store or a CCC store.

In this situation, the user may not understand the reason why it has failed to operate the multifunction copying machine, whether due to an error made by the user itself, a malfunction of the multifunction copying machine, or a malfunction of the terminal apparatus 10.

Figure 2:
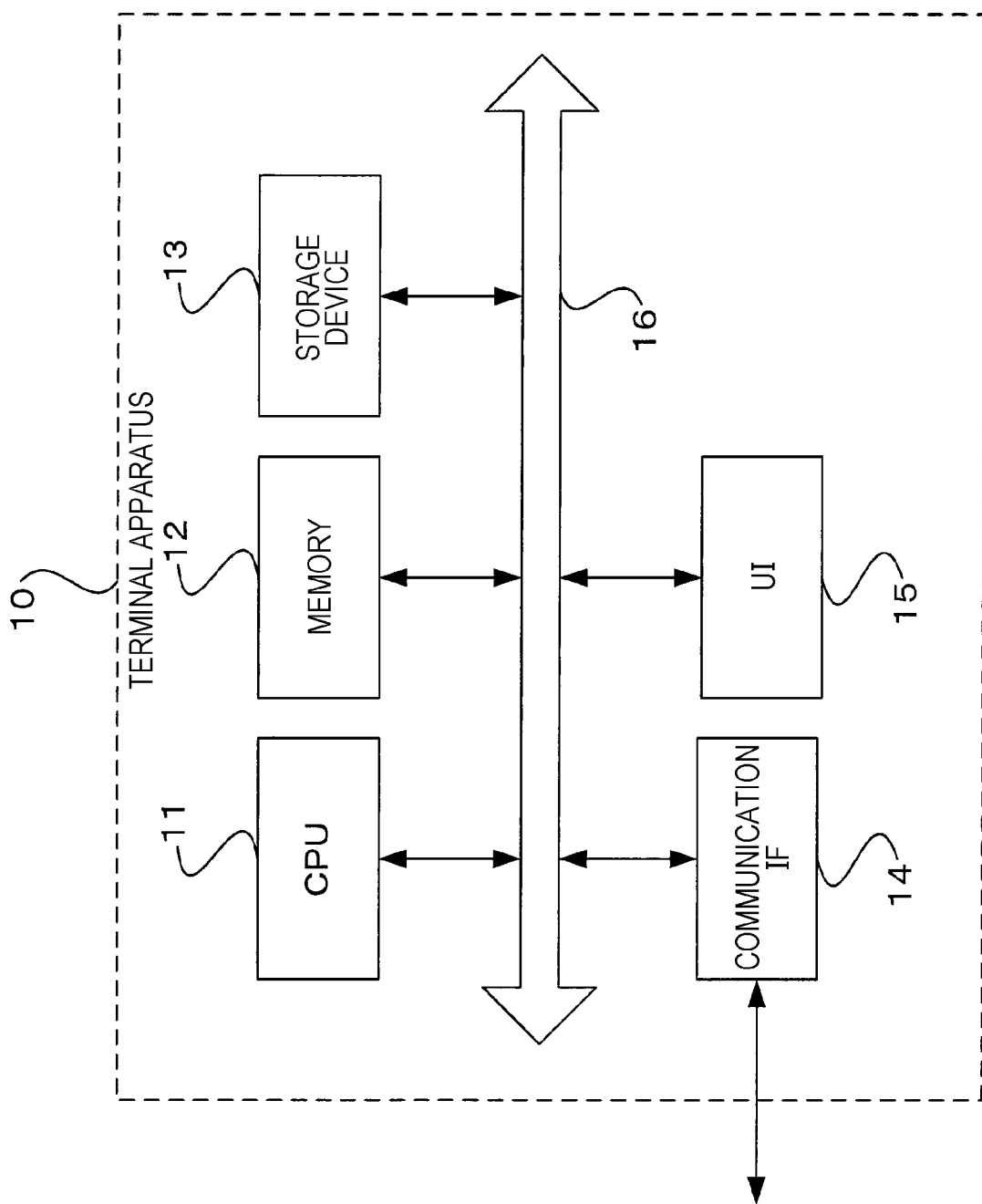
FIG. 2 is a block diagram illustrating an example of the hardware configuration of a terminal apparatus according to an exemplary embodiment.

FIG. 2 illustrates an example of the hardware configuration of the terminal apparatus 10 in the information processing system of this exemplary embodiment.

As shown in FIG. 2, the terminal apparatus 10 includes a central processing unit (CPU) 11, a memory 12, a storage device 13, such as a hard disk drive (HDD), a communication interface (IF) 14, and a user interface (UI) 15. The communication IF 14 sends and receives data to and from an external device via a network. The UI 15 includes a touch-screen or a set of a liquid crystal display and a keyboard. The above-described elements are connected to each other via a control bus 16.

The CPU 11 executes predetermined processing based on a control program stored in the memory 12 or the storage device 13 so as to control the operation of the terminal apparatus 10. In this exemplary embodiment, the CPU 11 executes the control program stored in the memory 12 or the storage device 13. However, the control program may be downloaded as an app and be provided to the CPU 11.

Figure 3:
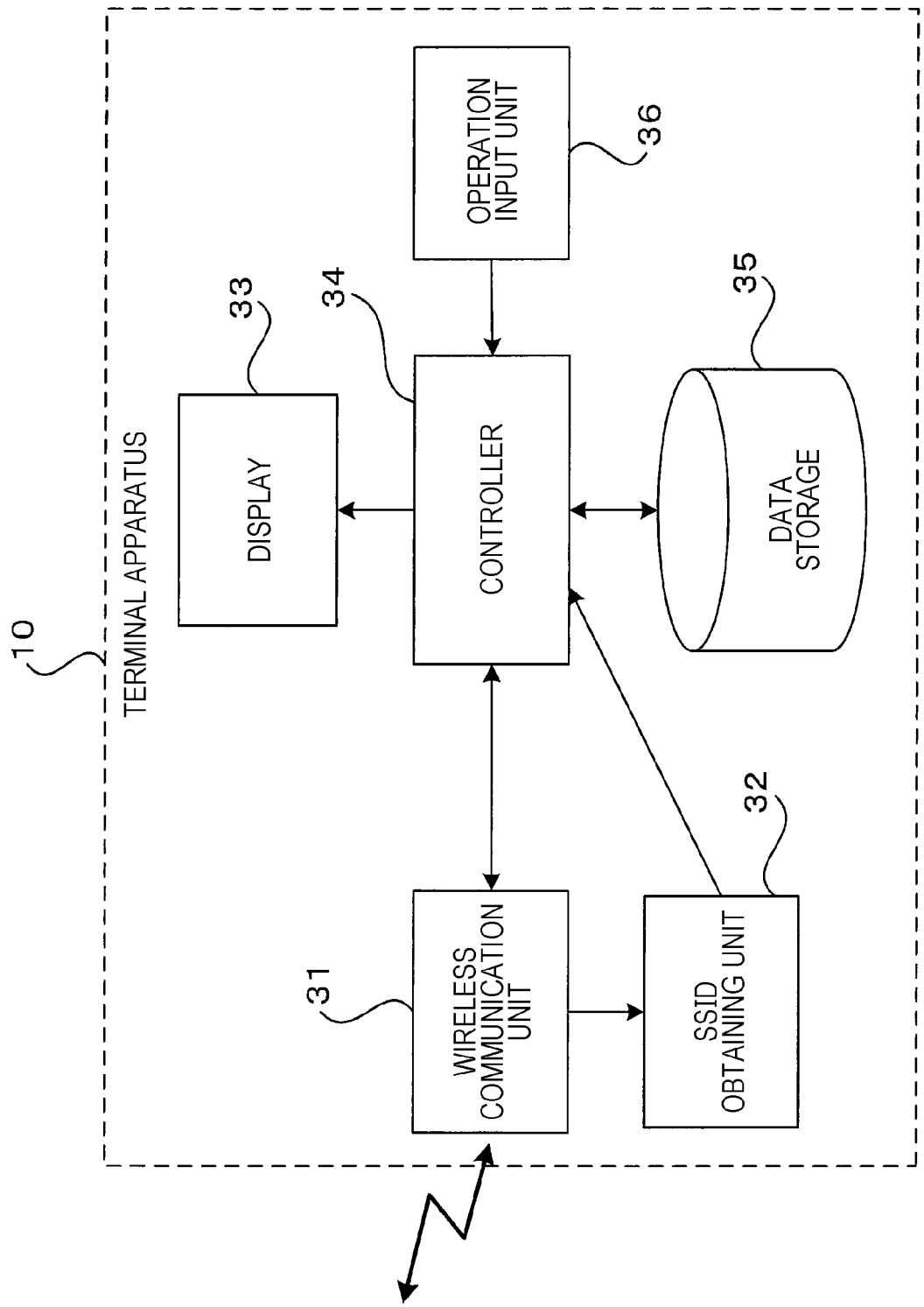
FIG. 3 is a block diagram illustrating an example of the functional configuration of the terminal apparatus.

FIG. 3 is a block diagram illustrating an example of the functional configuration of the terminal apparatus 10 implemented as a result of the CPU 11 executing the above-described control program.

As shown in FIG. 3, the terminal apparatus 10 includes a wireless communication unit 31, an SSID obtaining unit 32, a display 33, a controller 34, a data storage 35, and an operation input unit 36.

The wireless communication unit 31 sends and receives data to and from the image forming apparatus 30 and the wireless LAN terminal 20 via a wireless communication network.

The SSID obtaining unit 32 obtains SSIDs, which are identification information included in radio waves that are receivable by the wireless communication unit 31. More specifically, the SSID obtaining unit 32 obtains SSIDs from radio waves received by the wireless communication unit 31, that is, radio waves transmitted from the wireless LAN terminal 20.

The operation input unit 36 receives various operations input by a user. The display 33 displays various items of information under the control of the controller 34.

The controller 34 provides a certain service to a user, based on the operation input from the user via the operation input unit 36. The controller 34 provides the following service. Upon receiving an instruction to print image data from the user, the controller 34 sends the image data to the image forming apparatus 30 via the wireless communication unit 31 and instructs the image forming apparatus 30 to print the image data. Hereinafter, this service will be called the multifunction copying machine service.

The data storage 35 stores data to be used by the controller 34 to execute control operations. For example, the data storage 35 stores image data, such as photo images, to be printed by the image forming apparatus 30 and image data scanned by the image forming apparatus 30. The data storage 35 also stores information, such as that shown in FIG. 4, concerning the association between SSIDs assigned to a free Wi-Fi service of BBB stores and that of CCC stores and apps for using the multifunction copying machines installed in BBB stores and those in CCC stores.

If the user is located in a place where a certain multifunction copying machine service to be used by the user is not available, such a place being estimated from SSIDs obtained by the SSID obtaining unit 32, the controller 34 supplies information concerning how the user can use this service to the user via the display 33.

More specifically, if the user is not located in a place where a certain multifunction copying machine service to be used by the user is available, the controller 34 provides an instruction to go to a place where this service is available to the user.

That is, if the type of store where the user is located, which is estimated from SSIDs obtained by the SSID obtaining unit 32, is a store in which a certain multifunction copying machine service is not available, the controller 34 instructs the user to go to a store where this service is available. For example, it is assumed that the user has started the app for using the image forming apparatus 30 installed in an AAA store. In this case, if the SSID obtained by the SSID obtaining unit 32 is "BBB#free#wifi", which is the SSID of BBB stores, the controller 34 assumes that the user is in a BBB store. The AAA-store multifunction copying machine service is not available in a BBB store, and the controller 34 provides an instruction to go to an AAA store to the user.

More specifically, if the SSIDs obtained by the SSID obtaining unit 32 do not include an SSID in radio waves transmitted from a store where a certain multifunction copying machine service is available, the controller 34 provides an instruction to go to a store where this service is available to the user.

If the store where the user is estimated to be located is not a store where a certain multifunction copying machine service is available, for example, if the user is in a BBB store, the controller 34 may provide an instruction to use a service available in this store, such as the multifunction copying machine service in BBB stores.

The operation of the information processing system according to the exemplary embodiment will be described below with reference to FIGS. 5 through 12.

Figure 5:
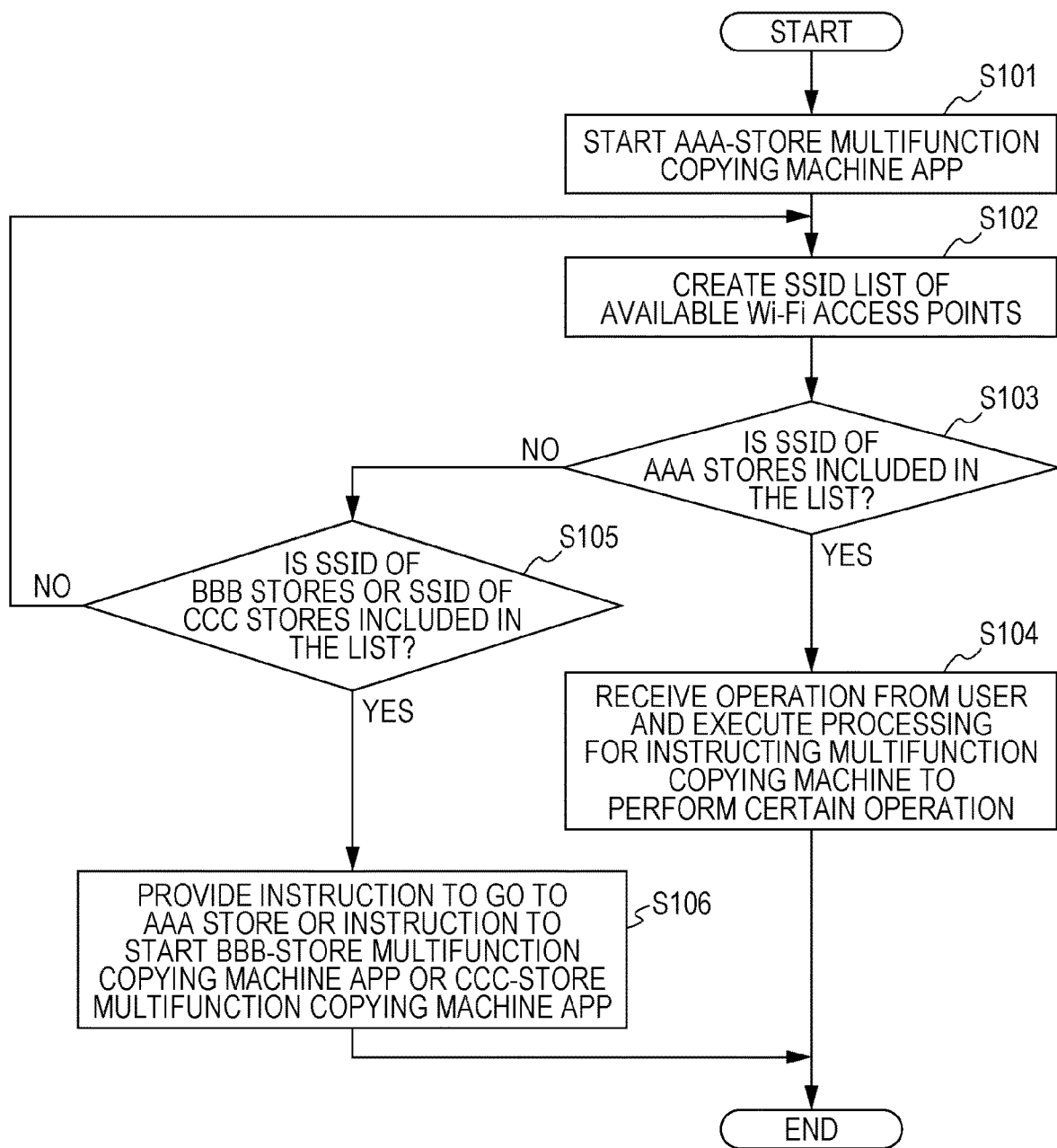
FIG. 5 is a flowchart illustrating an example of an operation executed by the terminal apparatus when a user has started an AAA-store multifunction copying machine app and has entered a certain store.

FIG. 5 is a flowchart illustrating an example of the operation executed by the terminal apparatus 10 when a user has started the AAA-store multifunction copying machine app for using the image forming apparatus 30 (multifunction copying machine) installed in an AAA store and has entered a certain store.

Figure 6:
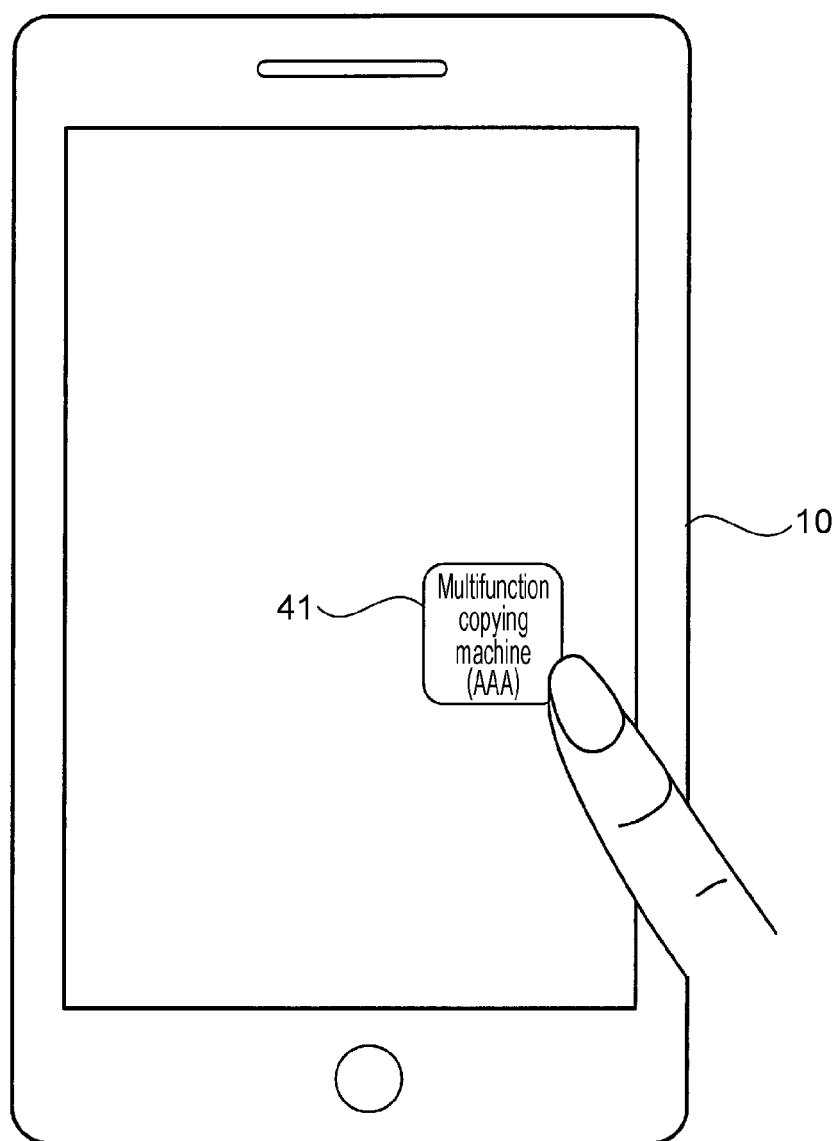
FIG. 6 illustrates an example of an operation screen for starting the AAA-store multifunction copying machine app.

In step S101, the user first touches an icon 41 on the operation screen of the terminal apparatus 10 to start the AAA-store multifunction copying machine app, as shown in FIG. 6.

A description will be given below, assuming that the user has started the AAA-store multifunction copying machine app and entered one of AAA stores, BBB stores, and CCC stores.

The wireless communication unit 31 receives radio waves transmitted from the store that the user has entered. Then, the SSID obtaining unit 32 obtains SSIDs from the radio waves received by the wireless communication unit 31. In step S102, the controller 34 creates a list of the SSIDs obtained by the SSID obtaining unit 32, that is, a list of available Wi-Fi access points. An example of an SSID list is shown in FIG. 7.

The controller 34 then judges in step S103 whether "AAAspot", which is the SSID of AAA stores, is included in the list created in step S102. With the SSID "AAAspot", the user is able to receive the AAA-store multifunction copying machine service by using the AAA-store multifunction copying machine app.

Figure 7:
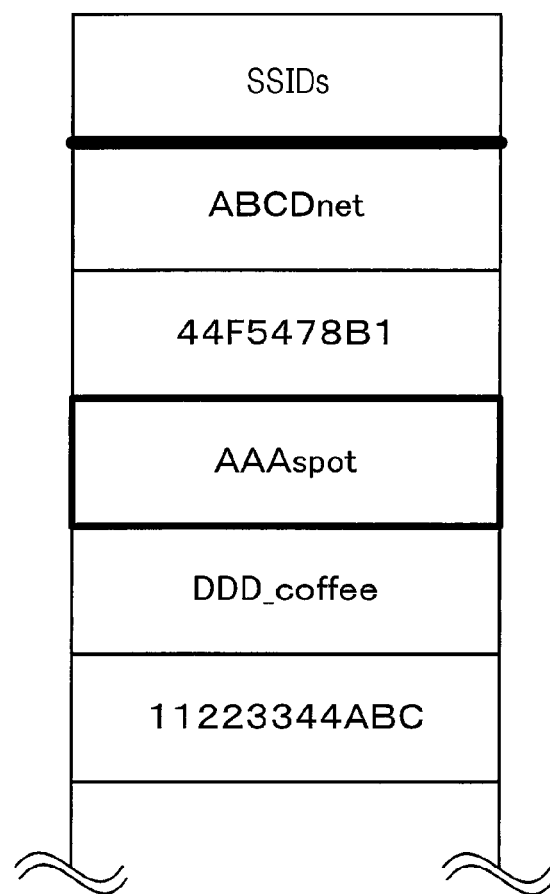
FIG. 7 illustrates an example of an SSID list.

For example, in the SSID list shown in FIG. 7, the SSID called "AAAspot" is included. The controller 34 thus determines that the SSID called "AAAspot" is included in the list, that is, the user is in an AAA store (YES in step S103).

Figure 8:
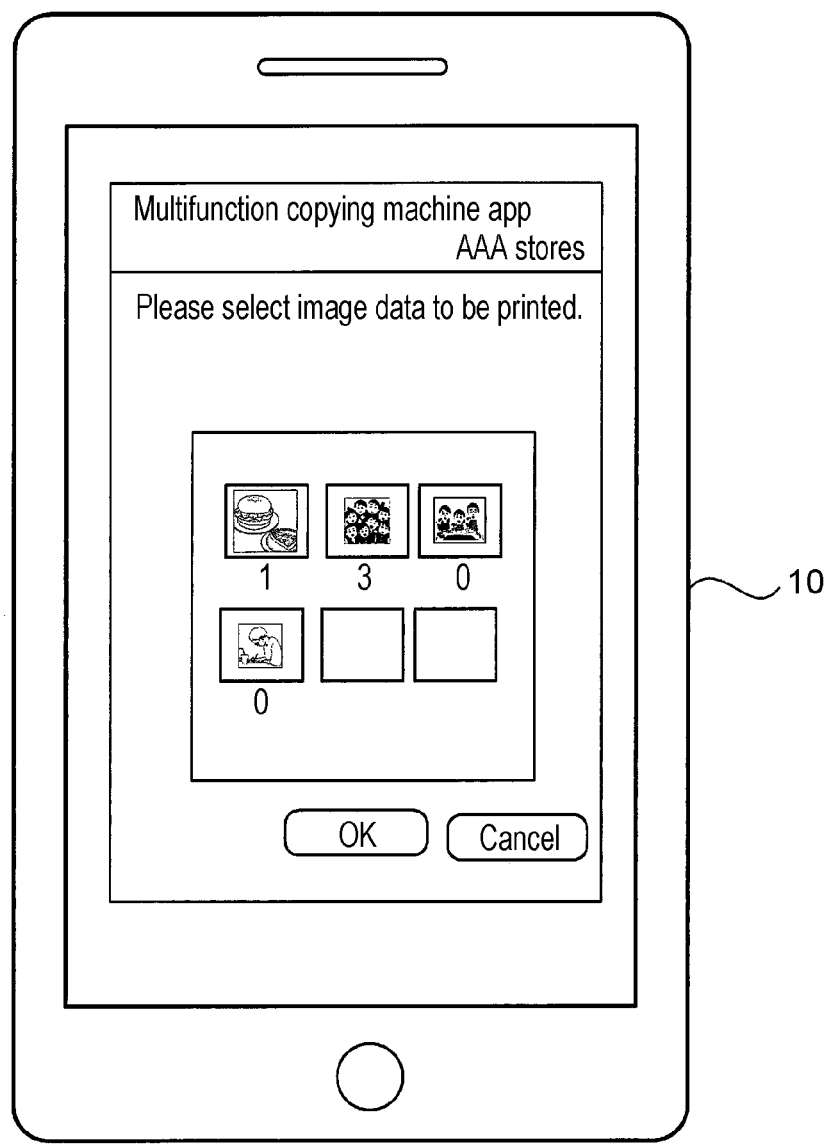
FIG. 8 illustrates an example of an operation screen for executing processing for instructing an image forming apparatus to perform a certain operation by using the AAA-store multifunction copying machine app.

Then, in step S104, the controller 34 receives an operation input from the operation input unit 36 by the user using the operation screen, such as that shown in FIG. 8, and executes processing for instructing the image forming apparatus 30 (multifunction copying machine) to perform a certain operation by using the wireless communication unit 31.

An explanation will be given in a case in which a list of SSIDs obtained by the SSID obtaining unit 32 is that shown in FIG. 9.

Figure 9:
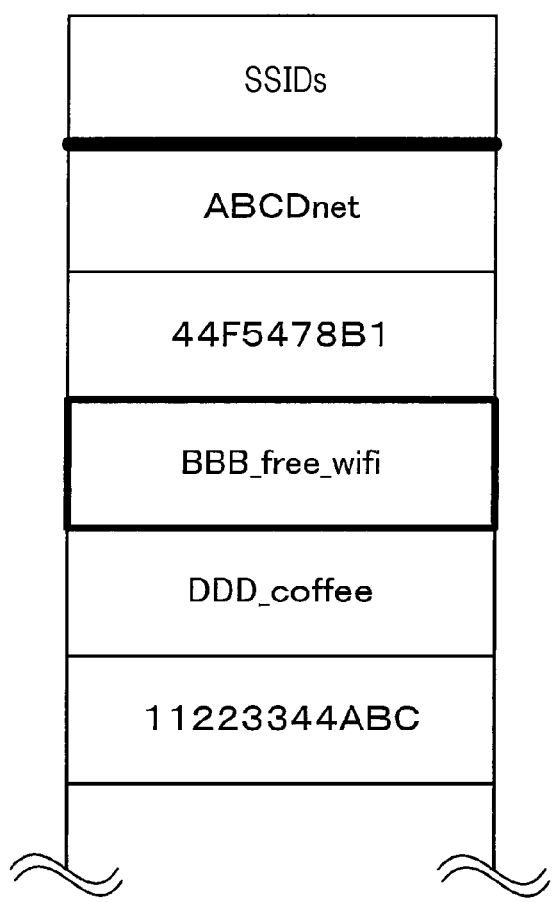
FIG. 9 illustrates another example of an SSID list.

In the SSID list shown in FIG. 9, "AAAspot" is not included, but "BBB#free#wifi", which is the SSID of BBB stores for providing a free Wi-Fi service, is included.

In this case, the SSID called "AAAspot" is not included in the list, and the controller 34 judges that the user is not in an AAA store (NO in step S103).

The controller 34 then judges in step S105 whether "BBB#free#wifi", which is the SSID of BBB stores, or "CCC#wi-fi", which is the SSID of CCC stores, is included in the list.

If neither of the SSID of BBB stores nor the SSID of CCC stores is included in the list (NO in step S105), the controller 34 returns to step S102 to repeatedly generate a list of SSIDs of Wi-Fi access points at regular time intervals.

If one of the SSID of BBB stores and that of CCC stores is included in the list (YES in step S105), the controller 34 assumes that the user is in a BBB store or a CCC store. Then, in step S106, the controller 34 provides an instruction to go to an AAA store to the user or an instruction to start the BBB-store multifunction copying machine app or the CCC-store multifunction copying machine app. If the controller 34 provides the second instruction, it selects an app to be started based on the SSIDs included in the list by using the information indicating the association between SSIDs and apps, such as that shown in FIG. 4.

If "BBB#free#wifi", which is the SSID of BBB stores, is included in the list, the controller 34 instructs the user to start the BBB-store multifunction copying machine app via the use of the display 33. An example of such an instruction is shown in FIG. 10.

Figure 10:
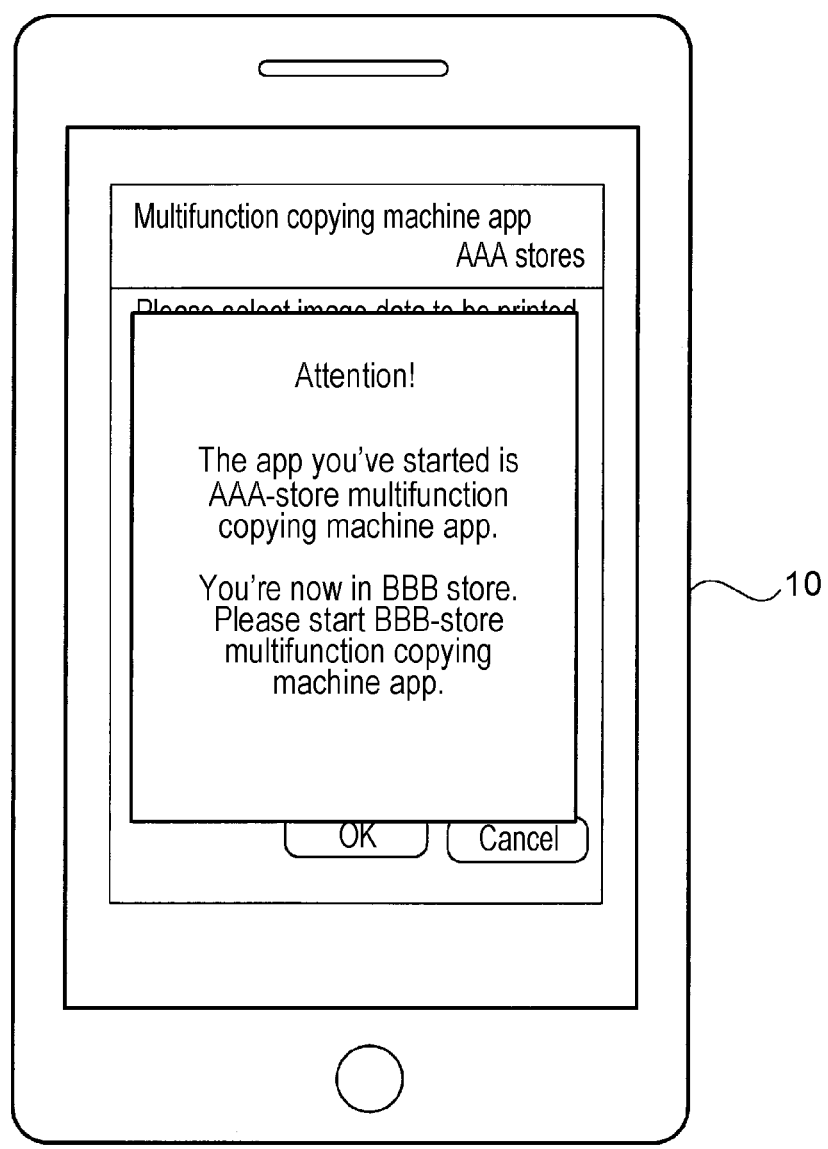
FIG. 10 illustrates an example of an instruction given to a user to start a BBB-store multifunction copying machine app.

FIG. 10 illustrates an example of an instruction given to a user to start the BBB-store multifunction copying machine app. More specifically, a message "The app you've started is AAA-store multifunction copying machine app. You're now in BBB store. Please start BBB-store multifunction copying machine app." is displayed on the display 33.

Figure 11:
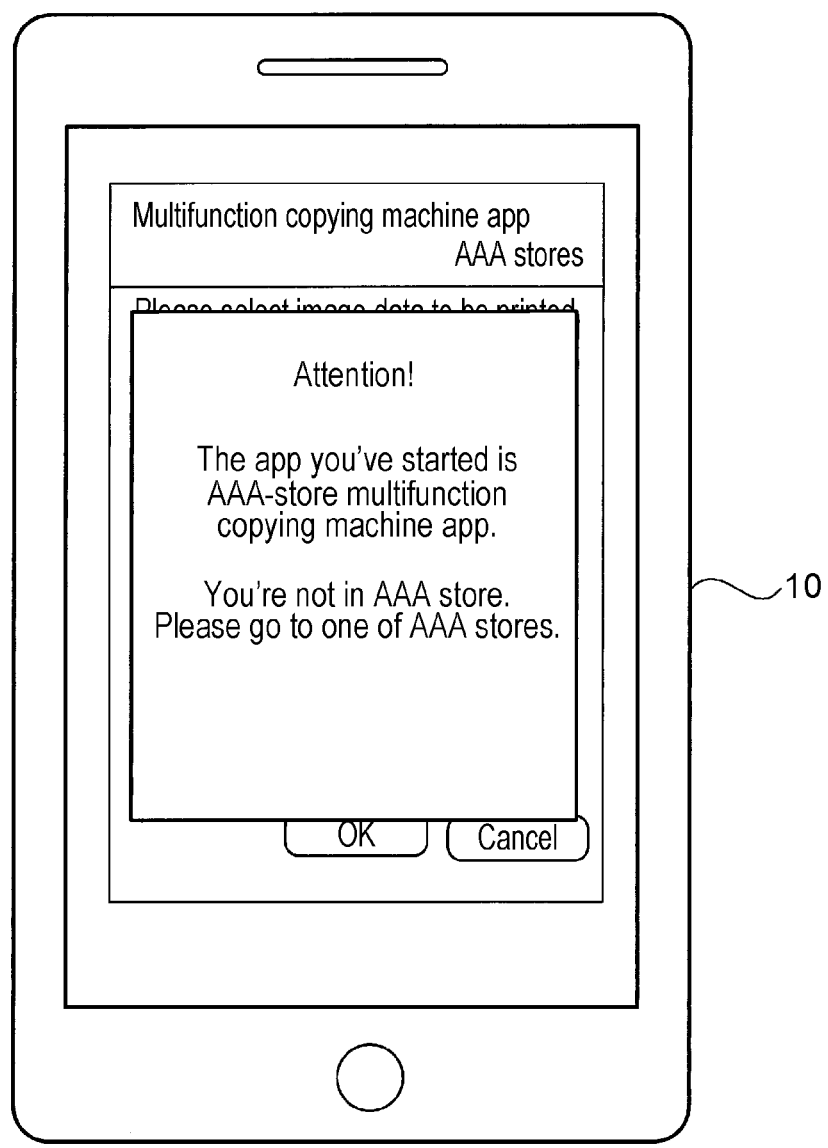
FIG. 11 illustrates an example of an instruction given to a user to go to an AAA store.
Figure 12:
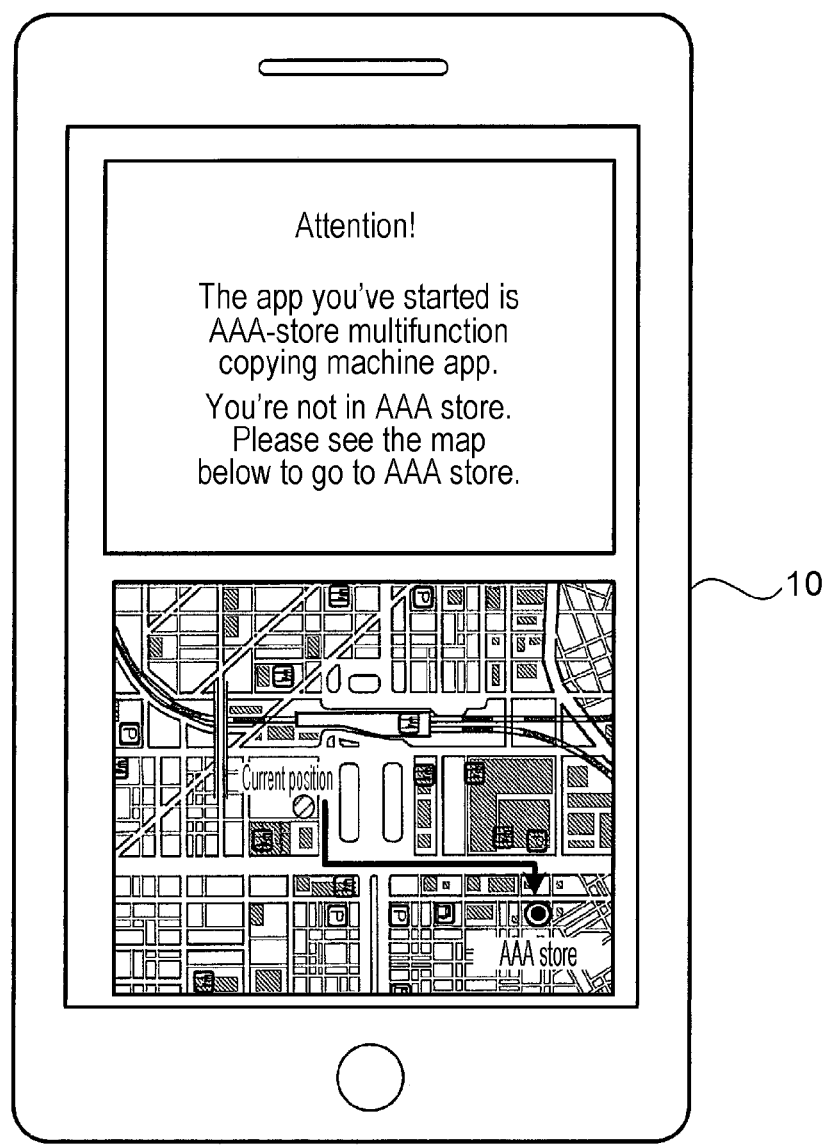
FIG. 12 illustrates an example of an instruction given to a user to go to an AAA store by displaying map information indicating a route to the AAA store.

FIGS. 11 and 12 illustrate examples of an instruction to go to an AAA store provided to a user by the controller 34.

FIG. 11 shows a message "The app you've started is AAA-store multifunction copying machine app. You're not in AAA store. Please go to one of AAA stores." on the display 33.

FIG. 12 shows a message "The app you've started is AAA-store multifunction copying machine app. You're not in AAA store. Please see the map below to go to AAA store." on the display 33. Map information indicating a route to the AAA store is also displayed on the display 33.

To display the instruction, such as that in FIG. 12, it is necessary that the terminal apparatus 10 integrate a global positioning system (GPS) receiver to obtain information concerning the current position of the terminal apparatus 10. It is also necessary that information concerning the positions of AAA stores that are open be stored in the terminal apparatus 10 or in a server. Then, based on the information concerning the current position of the terminal apparatus 10, the controller 34 identifies the closest AAA store and displays the route to the closest AAA store on the map information.

While the user is moving to the AAA store, the position of the user may be updated on the map information and be used for guiding the user to the AAA store.

Modified examples will be described below. In the above-described exemplary embodiment, the service provided by the terminal apparatus 10 is that for using a multifunction copying machine (image forming apparatus) installed in a store. However, this is only an example. The present disclosure may be applicable to any case in which a user receives a service provided in a store by using the terminal apparatus 10.

In the above-described exemplary embodiment, an SSID, which is an identifier for a wireless-LAN access point, is used for estimating the location or the type of store where a user is positioned, and then, the controller 34 judges whether the user is able to utilize a certain service. However, this is only an example. The present disclosure may be applicable to any case if it is possible to estimate the location or the type of store where a user is positioned by identification information included in radio waves transmitted from a store.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a controller configured to:
provide a certain service to a user;
obtain identification information included in receivable radio waves; and
provide information how a user is able to use the service if a place where the user is positioned is not a place where the service is available, the place where the user is positioned is estimated by the identification information that has been obtained, wherein if the place where the user is positioned is not a place where the service is available, the controller is configured to provide information indicating an instruction to use a service which is available in the place where the user is currently positioned.

2. The information processing apparatus according to claim 1, wherein, if the place where the user is positioned is not a place where the service is available, the controller is configured to provide information indicating an instruction to go to a place where the service is available.

3. The information processing apparatus according to claim 2, wherein:
the place where the user is positioned is a type of store where the user is positioned; and
if the store where the user is positioned is not a store where the service is available, the controller is configured to provide information indicating an instruction to go to a store where the service is available.

4. An information processing apparatus comprising:
a controller configured to:
provide a certain service to a user;
obtain identification information included in receivable radio waves; and
provide information how a user is able to use the service if the identification information that has been obtained does not include identification information in radio waves transmitted from a place where the service is available.

5. The information processing apparatus according to claim 4, wherein, if the identification information that has been obtained does not include identification information in radio waves transmitted from a place where the service is available, the controller is configured to provide information indicating an instruction to go to a place where the service is available.

6. The information processing apparatus according to claim 5, wherein:
a place where the user is positioned is a type of store where the user is positioned, the place where the user is positioned is estimated by the identification information that has been obtained; and
if the identification information that has been obtained includes identification information in radio waves transmitted from a store where the service is not available, the controller is configured to provide information indicating an instruction to go to a store where the service is available.

7. The information processing apparatus according to claim 1, wherein:
the place where the user is positioned is a type of store where the user is positioned; and
if the store where the user is positioned is not a store where the service is available, the controller is configured to provide information indicating an instruction to use a service which is available in the store where the user is positioned.

8. The information processing apparatus according to claim 3, wherein the service is a service for using an image forming apparatus installed in a store.

9. The information processing apparatus according to claim 6, wherein the service is a service for using an image forming apparatus installed in a store.

10. The information processing apparatus according to claim 7, wherein the service is a service for using an image forming apparatus installed in a store.

11. The information processing apparatus according to claim 1, wherein the identification information is an identifier for an access point of a wireless local area network.

12. The information processing apparatus according to claim 11, wherein the identifier is a service set identifier for an access point of a wireless local area network.

13. A non-transitory computer readable medium storing a program causing a computer to execute a process, the process comprising:
obtaining identification information included in receivable radio waves; and
providing information how a user is able to use a certain service if a place where the user is positioned is not a place where the service is available, the place where the user is positioned is estimated by the obtained identification information, wherein if the place where the user is positioned is not a place where the service is available, the process further includes to provide information indicating an instruction to use a service which is available in the place where the user is currently positioned.

14. An information processing method comprising:
providing a certain service to a user;
obtaining identification information included in receivable radio waves; and
providing information how a user is able to use the service if a place where the user is positioned is not a place where the service is available, the place where the user is positioned is estimated by the identification information that has been obtained, wherein if the place where the user is positioned is not a place where the service is available, the method further includes providing information indicating an instruction to use a service which is available in the place where the user is currently positioned.

15. The information processing apparatus according to claim 1, wherein the controller of the information processing apparatus in which an application providing the service is installed is configured to estimate the place where the user is positioned based on the identification information included in receivable radio waves.

\* \* \* \* \*